United States Patent
Kim et al.

(10) Patent No.: US 8,086,053 B2
(45) Date of Patent: Dec. 27, 2011

(54) METHOD AND APPARATUS FOR TRANSFORMING AND INVERSE-TRANSFORMING IMAGE

(75) Inventors: So-young Kim, Seoul (KR); Woo-jin Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1144 days.

(21) Appl. No.: 11/844,782

(22) Filed: Aug. 24, 2007

(65) Prior Publication Data
US 2008/0049854 A1    Feb. 28, 2008

(30) Foreign Application Priority Data
Aug. 24, 2006  (KR) .................... 10-2006-0080644

(51) Int. Cl.
*G06K 9/36*  (2006.01)
*G06K 9/46*  (2006.01)
(52) U.S. Cl. ........ 382/239; 382/232; 382/248; 382/250; 382/280
(58) Field of Classification Search .................. 382/239, 382/248, 250, 232, 280
See application file for complete search history.

(56) References Cited

U.S. PATENT DOCUMENTS

| | | | |
|---|---|---|---|
| 5,737,450 A * | 4/1998 | Hajjahmad et al. | 382/260 |
| 6,697,433 B1 * | 2/2004 | Isu et al. | 375/240.27 |
| 2002/0031247 A1 * | 3/2002 | Matsuura et al. | 382/132 |
| 2002/0071610 A1 | 6/2002 | Rackett | |
| 2004/0151386 A1 * | 8/2004 | Kodama et al. | 382/232 |
| 2005/0169497 A1 * | 8/2005 | Gustafson et al. | 382/100 |

FOREIGN PATENT DOCUMENTS

CN        1295696 A      5/2001

OTHER PUBLICATIONS

Chinese Office Action issued on Dec. 3, 2010 in the corresponding Chinese Patent Application No. 200710167623.8.
Communication from the State Intellectual Property Office of P.R. China dated Jul. 4, 2011, in counterpart Chinese Application No. 200710167623.8.

* cited by examiner

*Primary Examiner* — Bhavesh Mehta
*Assistant Examiner* — Bernard Krasnic
(74) *Attorney, Agent, or Firm* — Sughrue Mion, PLLC

(57) ABSTRACT

Provided are a method and apparatus for transforming an image, in which an input image is transformed into a frequency domain by selectively using a plurality of frequency transform algorithms according to a frequency characteristic of the input image. The method includes: selecting a frequency transform algorithm to be used for a current block from a plurality of frequency transform algorithms according to a result obtained by transforming frequencies of peripheral blocks adjacent to the current block; and transforming the current block into a frequency domain by using the selected frequency transform algorithm.

18 Claims, 8 Drawing Sheets

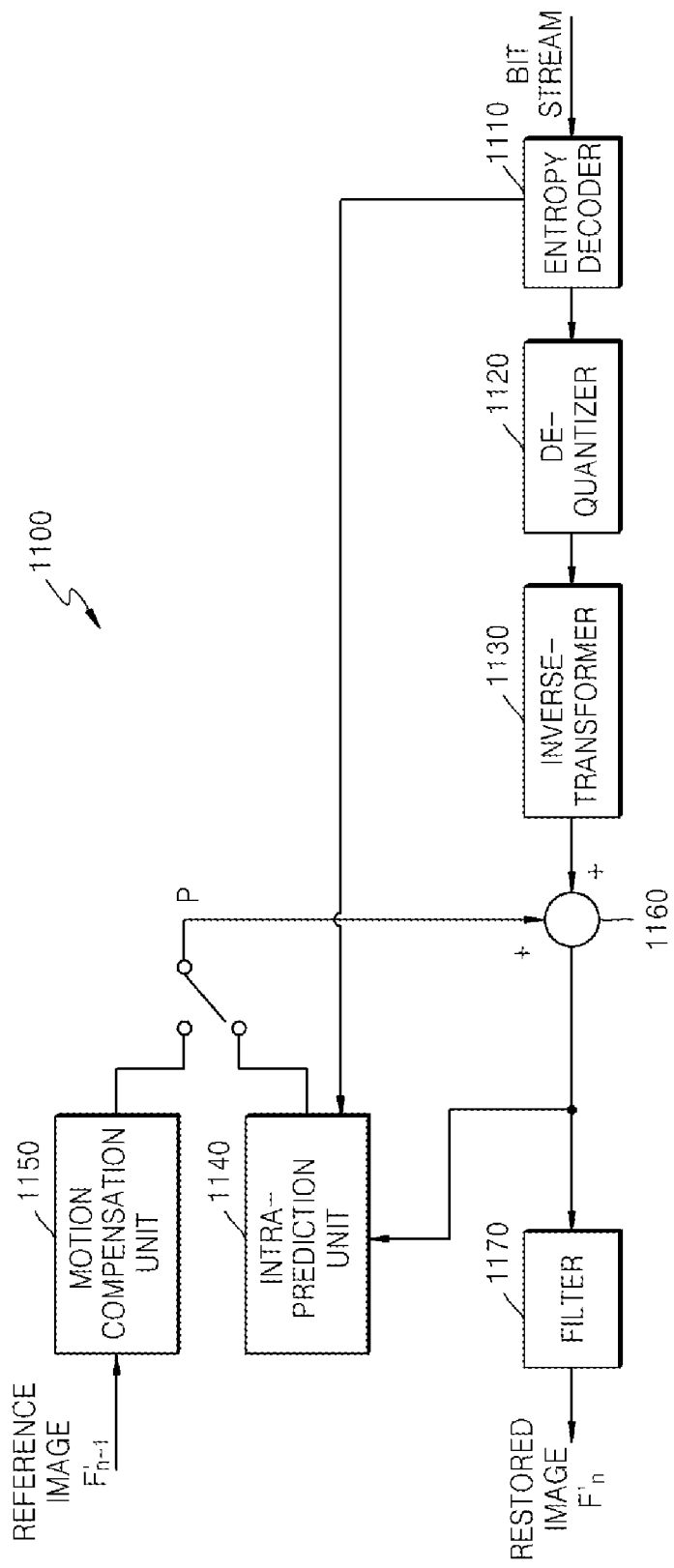

METHOD AND APPARATUS FOR TRANSFORMING AND INVERSE-TRANSFORMING IMAGE

CROSS-REFERENCE TO RELATED PATENT APPLICATION

This application claims priority from Korean Patent Application No. 10-2006-0080644, filed on Aug. 24, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to video coding and decoding, and more particularly, to transforming and inverse-transforming an image, in which a plurality of frequency transform algorithms are selectively used.

2. Description of the Related Art

Various transform algorithms have been proposed for image and video compression. One of the most widely used transform algorithms may be either a block-based transform algorithm or an image-based transform algorithm. Examples of the block-based transform algorithm include a Karhuhen-Loeve transform (KLT) algorithm, a singular value decomposition (SVD) algorithm, and a discrete cosine transform (DCT) algorithm. The block-based transform algorithm is used for transforming an N×N image block or an error sample block.

According to the DCT algorithm, an input image signal is divided into a low frequency component and a high frequency component. Energy is concentrated in the low frequency component as a result of the DCT algorithm. Thus, the high frequency component can be easily removed in the process of quantization. A human visual system is sensitive to the loss of low frequency component rather than the loss of high frequency component. Accordingly, even if the high frequency component is removed, the image can be compressed without significant degradation of image quality.

FIG. 1 is a schematic view for explaining a concept of a related art DCT algorithm.

Referring to FIG. 1, according to the related art DCT algorithm, an N×N input block 10 is subject to a column-wise transform 20 and a row-wise transform 30 to form an N×N coefficient block 40. A forward DCT is defined as $Y = AxA^T$, where x denotes the N×N input block 10, A denotes an N×N DCT matrix, and Y denotes the N×N coefficient block 40. To perform a first matrix multiplication Ax, each column of x, that is, the N×N input block 10, is subject to a one-dimensional DCT. To multiply Ax by a transposition matrix $A^T$, each row of x is subject to the one-dimensional DCT.

$\alpha_{ik}$ is (i,k) component of the N×N DCT matrix A and is expressed by Equation 1.

$$a_{ik} = \alpha_i \cos \frac{\pi(2k+1)i}{2N} \quad \text{[Equation 1]}$$

$$\left( i, k = 0, \ldots, N-1, \alpha_0 = \sqrt{\frac{1}{N}}, \alpha_i = \sqrt{\frac{2}{N}} \right)$$

FIG. 2 illustrates a standard basis pattern for 8×8 DCT. When an N×N input block is subject to DCT, an N×N coefficient block composed of DCT coefficients is created. The DCT coefficients are associated with a weight factor of a set of standard basis patterns as shown in FIG. 2. Referring to FIG. 2, the standard basis pattern is configured in combination of a horizontal cosine function and a vertical cosine function. An image block may be reconfigured by combining respective patterns included in the standard basis pattern after being multiplied by DCT coefficients corresponding to the respective patterns.

In the related art scheme, the same DCT is used irrespective of image signal characteristics. Therefore, there is a need for increasing compression efficiency by adaptively performing DCT according to the image signal characteristics.

SUMMARY OF THE INVENTION

Exemplary embodiments of the present invention overcome the above disadvantages and other disadvantages not described above. In addition, the present invention is not required to overcome the disadvantages described above, and an exemplary embodiment of the present invention may not overcome any of the problems described above.

The present invention provides a method and apparatus for transforming and inverse-transforming an image whereby coding efficiency can be improved by adaptively using different frequency transform algorithms for respective blocks according to a frequency characteristic of an input image.

According to an aspect of the present invention, there is provided a method of transforming an image, including: selecting a frequency transform algorithm to be used for a current block from a plurality of frequency transform algorithms according to a result obtained by transforming frequencies of peripheral blocks adjacent to the current block; and transforming the current block into a frequency domain by using the selected frequency transform algorithm.

According to another aspect of the present invention, there is provided an apparatus for transforming an image, including: a frequency transform algorithm selector which selects a frequency transform algorithm to be used for a current block from a plurality of frequency transform algorithms according to a result obtained by transforming frequencies of peripheral blocks adjacent to the current block; and a frequency transformer which transforms the current block into a frequency domain by using the selected frequency transform algorithm.

According to another aspect of the present invention, there is provided a method of inverse-transforming an image, including: extracting a frequency transform coefficient by entropy-decoding a coded bit-stream; selecting a frequency transform algorithm used to transform the extracted frequency transform coefficient from a plurality of frequency transform algorithms in which a frequency band is non-uniformly divided so that a specific frequency band component is further minutely transformed; and inverse-transforming the frequency transform coefficient by using the selected frequency transform algorithm.

According to another aspect of the present invention, there is provided an apparatus for inverse-transforming an image, including: a frequency transform algorithm selector which selects a frequency transform algorithm, which is used to transform a frequency transform coefficient extracted from a bit-stream, from a plurality of frequency transform algorithms in which a frequency band is non-uniformly divided so that a specific frequency band component is further minutely transformed; and an inverse-transformer which inverse-transforms the frequency transform coefficient by using the selected frequency transform algorithm.

BRIEF DESCRIPTION OF THE DRAWINGS

The above and other features of the present invention will become more apparent by describing in detail exemplary embodiments thereof with reference to the attached drawings in which:

FIG. 11 is a block diagram illustrating a structure of an image decoding system that employs an apparatus for inverse-transforming an image according to an exemplary embodiment of the present invention.

DETAILED DESCRIPTION OF EXEMPLARY EMBODIMENTS OF THE INVENTION

Hereinafter, exemplary embodiments of the present invention will be described in detail with reference to the accompanying drawings.

To facilitate understanding, a frequency of an image will be first described. An image which shows small changes within a frame has a significantly high correlation within the screen. In terms of frequency, the image showing small changes has a low spatial frequency component. On the contrary, an image showing large changes within the frame, for example, a checkerboard-shaped image alternately colored black and white, has a significantly low correlation within the frame. In terms of frequency, the image showing large changes has a high spatial frequency component.

In a related art frequency transform scheme such as DCT, an image is transformed into a frequency domain by using the same algorithm. If energy of the image is concentrated in a specific frequency band according to an image characteristic, it is preferable that the specific frequency band is further precisely transformed. For example, in the case of an image whose energy is concentrated in a low frequency band, such as the image showing small changes within the frame, image coding efficiency can be improved when transform is carried out by further minutely dividing the low frequency band.

Therefore, according to exemplary embodiments of the present invention, the image coding efficiency can be improved when transform is carried out on the basis of a characteristic of an input image by further minutely dividing a frequency band where a frequency component of the input image is concentrated.

For convenience, the following descriptions of the exemplary embodiments of the present invention will focus on DCT as a representative frequency transform scheme. However, the present invention is not limited thereto and thus may be applied to other frequency transform schemes.

Figure 1:
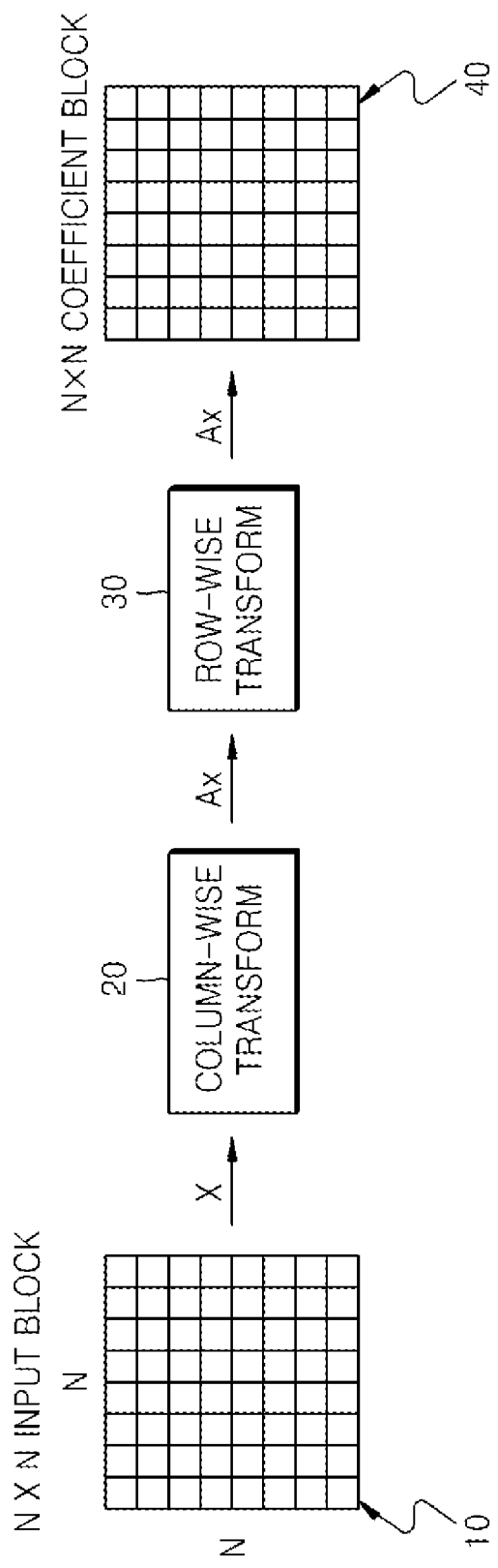
FIG. 1 is a schematic view for explaining a concept of a related art DCT algorithm.
Figure 2:
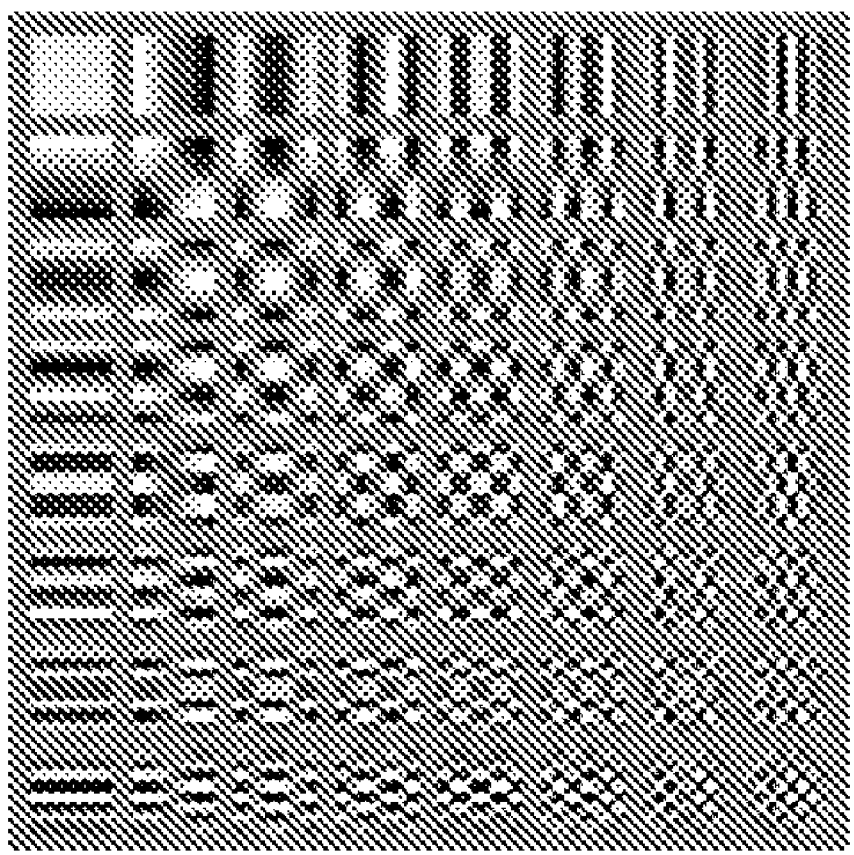
FIG. 2 illustrates a standard basis pattern for 8×8 DCT.
Figure 3:
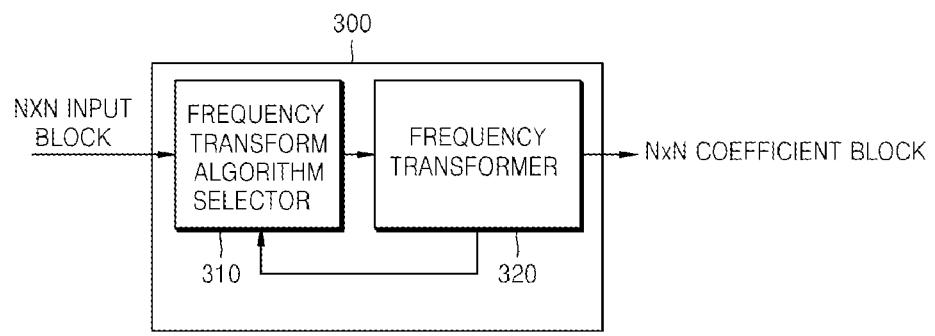
FIG. 3 is a block diagram illustrating a structure of an apparatus for transforming an image according to an exemplary embodiment of the present invention.

FIG. 3 is a block diagram illustrating a structure of an apparatus for transforming an image according to an exemplary embodiment of the present invention.

Referring to FIG. 3, an apparatus 300 for transforming an image includes a frequency transform algorithm selector 310 and a frequency transformer 320.

In consideration of a frequency characteristic of a current block, the frequency transform algorithm selector 310 selects a frequency transform algorithm to be used for the current block from a plurality of frequency transform algorithms. As will be described below, the plurality of frequency transform algorithms each have different frequency selection characteristics. According to these algorithms, a frequency component belonging to a specific band is extracted after being further minutely divided. If the current block is an inter-prediction block, the frequency transform algorithm selector 310 may predict the frequency characteristic of the current block in consideration of a frequency characteristic of a corresponding block of a reference frame. In addition, if a hierarchical coding is carried out by using a scalable coding scheme, the frequency transform algorithm selector 310 may predict the frequency characteristic of the current block in consideration of a corresponding block of a low hierarchy.

By using the frequency transform algorithm selected by the frequency transform algorithm selector 310, the frequency transformer 320 transforms the current block into a frequency domain.

FIGS. 4A to 4F are views for explaining frequency selection characteristics of a plurality of frequency transform algorithms according to an exemplary embodiment of the present invention.

Figure 4A:
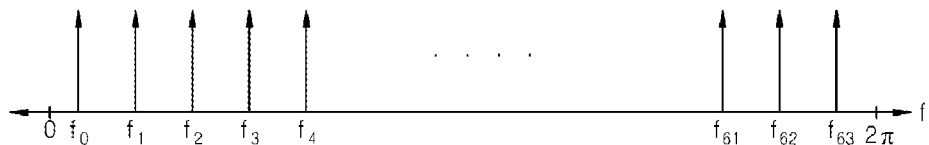
FIGS. 4A to 4F are views for explaining frequency selection characteristics of a plurality of frequency transform algorithms according to an exemplary embodiment of the present invention.

As shown in FIG. 4A, in the related art frequency transform scheme, frequency transform is carried out by using fixed frequency selection characteristics. On the other hand, as shown in FIGS. 4B to 4E, in the apparatus for transforming an image of the present invention, an input block is transformed into a frequency domain by selecting a frequency transform algorithm, in which a frequency band where frequency components of a current block is relatively densely concentrated is extracted after being further minutely divided, from a plurality of frequency transform algorithms having frequency selection characteristics different from one another.

Figure 4B:
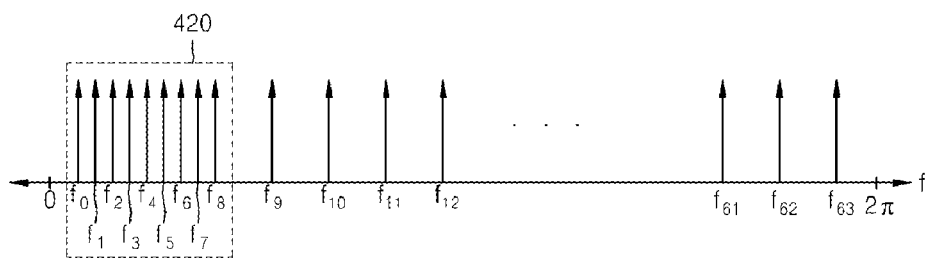
Figure 4C:
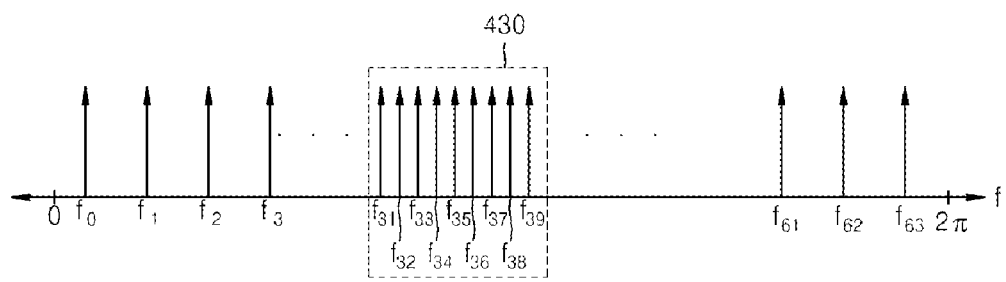
Figure 4D:
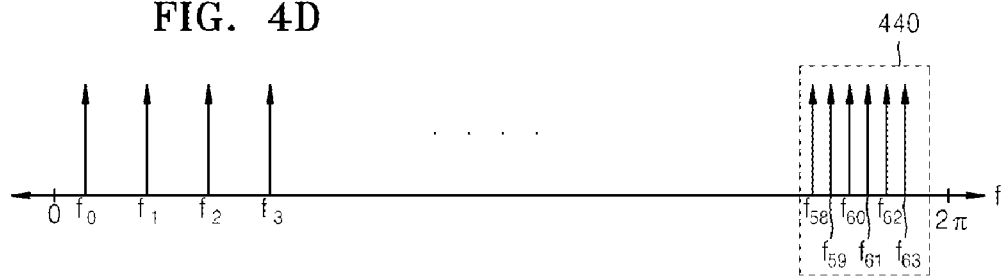
Figure 4E:
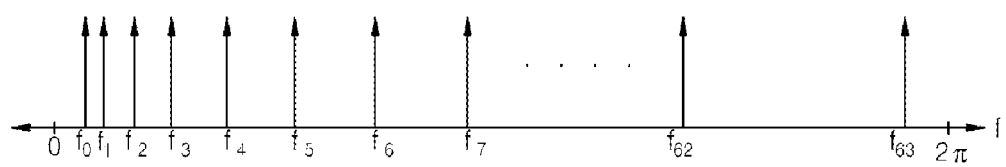
Figure 4F:
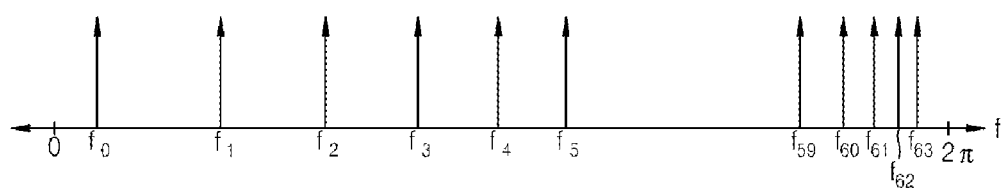

Specifically, the plurality of frequency transform algorithms of the present invention may have frequency characteristics in which, as shown in FIG. 4B, frequency components $f_0$ to $f_8$ of a low frequency band 420 may be extracted after being further minutely divided than those of other frequency bands. Further, as shown in FIG. 4C, frequency components $f_{31}$ to $f_{39}$ of an intermediate frequency band 430 may be extracted after being further minutely divided than other frequency bands. Furthermore, as shown in FIG. 4D, frequency components $f_{58}$ to $f_{63}$ of a high frequency band 440 may be extracted after being further minutely divided than other frequency band. Moreover, as shown in FIG. 4E, frequency components may be extracted from the input block in the unit of a frequency that increases non-linearly. In addition, as shown in FIG. 4F, frequency components may be extracted from the input block in the unit of a frequency that decreases non-linearly. The present invention is not limited thereto, and thus the plurality of frequency transform algorithms may have various frequency selection characteristics. The frequency transform algorithms having the frequency selection characteristics of FIGS. 4A to 4F may be designed by using a cosine function, similar to DCT.

Figure 5:
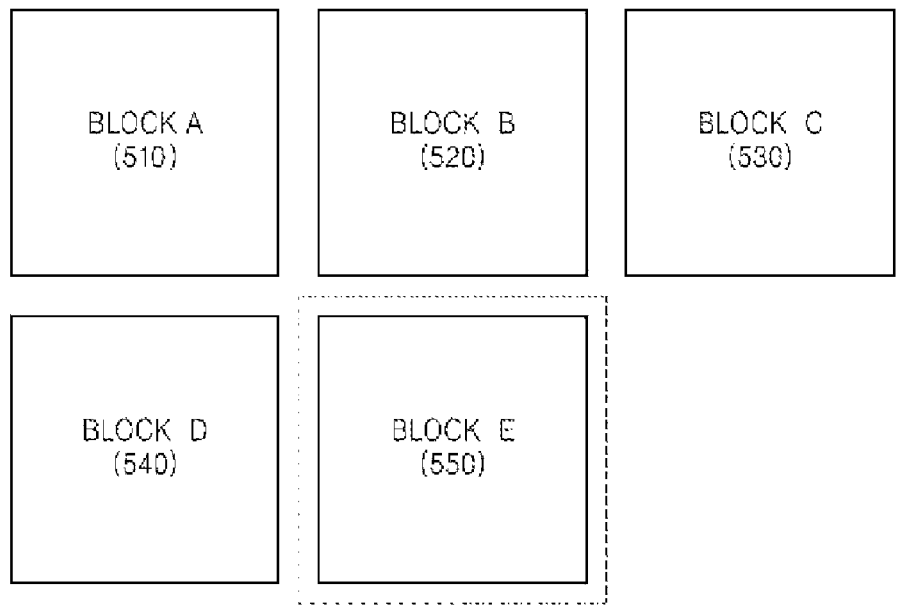
FIG. 5 is a view for explaining a procedure of determining a frequency characteristic of an input block in an apparatus for transforming an image according to an exemplary embodiment of the present invention.

FIG. 5 is a view for explaining a procedure of determining a frequency characteristic of an input block in an apparatus for transforming an image according to an exemplary embodiment of the present invention.

As described above, the frequency transform algorithm selector 310 may use information on frequency characteristics of peripheral blocks in order to determine a frequency characteristic of a current block to be transformed. Referring to FIG. 5, a frequency characteristic of a current block E 550 may be predicted by using a result obtained by transforming frequencies of peripheral blocks 510 to 530 which have previously undergone frequency transformation. This is because blocks spatially adjacent with each other are highly likely to have similar frequency characteristics. For example, the frequency transform algorithm selector 310 may determine the frequency characteristic of the current block E 550 by using a result obtained by transforming a frequency of a block B 520 upwardly adjacent to the current block E 550 or a frequency of a block D 540 left adjacent to the current block E 550.

Figure 6:
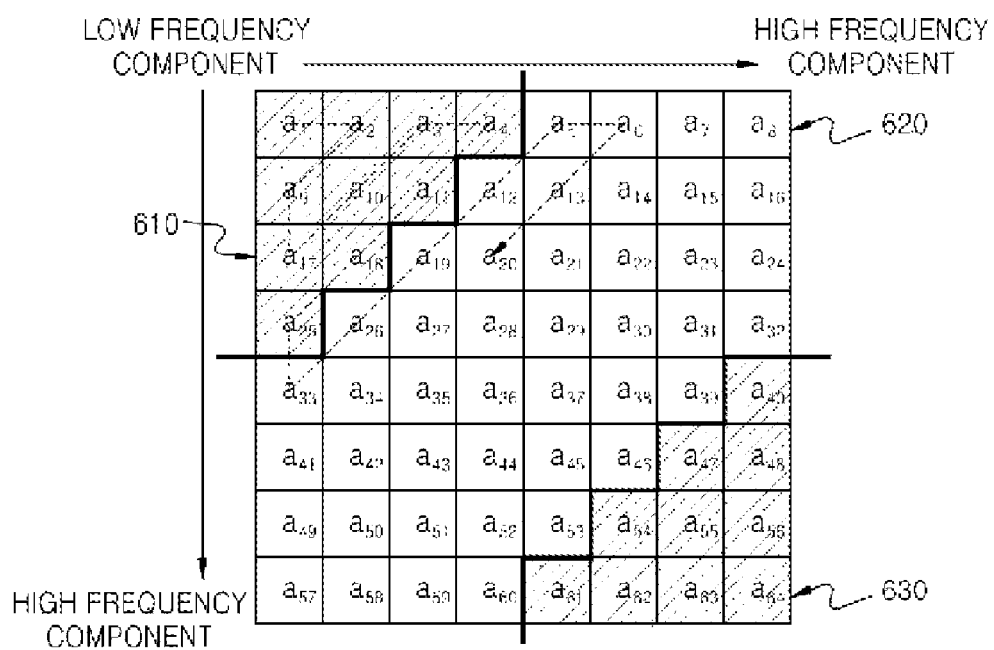
FIG. 6 is a view for explaining a frequency characteristic of a frequency-transformed block.

FIG. 6 is a view for explaining a frequency characteristic of a frequency-transformed block. In FIG. 6, $a_1$ to $a_{64}$ denote frequency transform coefficients of the frequency-transformed block.

Referring to FIG. 6, among the coefficients of the frequency-transformed block, frequency transform coefficients 610 located in an upper left portion are low frequency components included in an input block. Frequency transform coefficients 620 located in an intermediate portion are intermediate frequency components included in the input block. Frequency transform coefficients 630 located in a lower right portion are high frequency components included in the input block.

By using a result obtained by transforming frequencies of peripheral blocks, the frequency transform algorithm selector 310 compares the sum of low frequency components of the peripheral blocks, the sum of intermediate frequency components thereof, and the sum of high frequency components thereof with a specific threshold value, thereby determining frequency characteristics of the peripheral blocks. The determined frequency characteristics of the peripheral blocks are used to select a frequency transform algorithm to be used for the current block. For example, if the peripheral blocks are determined to be relatively concentrated in a low frequency band, as shown in FIG. 4B, the frequency transform algorithm selector 310 selects a frequency transform algorithm having a frequency characteristic in which the low frequency band is extracted after being further minutely divided.

Figure 7:
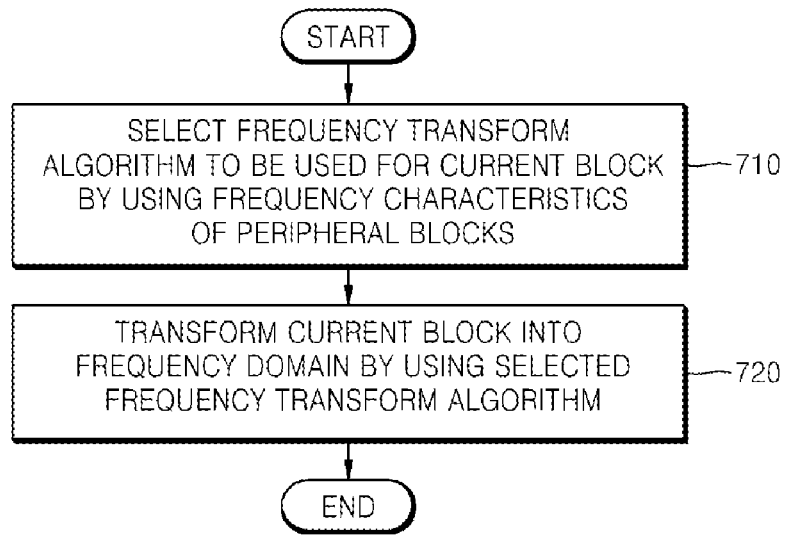
FIG. 7 is a flowchart of a method of transforming an image according to an exemplary embodiment of the present invention.

FIG. 7 is a flowchart of a method of transforming an image according to an exemplary embodiment of the present invention.

Referring to FIG. 7, a frequency characteristic of a current block is predicted according to a result obtained by transforming frequencies of peripheral blocks adjacent to the current block, and then a frequency transform algorithm to be used for the current block is selected from a plurality of frequency transform algorithms (operation 710).

The selected frequency transform algorithm is used to transform the current block into a frequency domain (operation 720).

Figure 8:
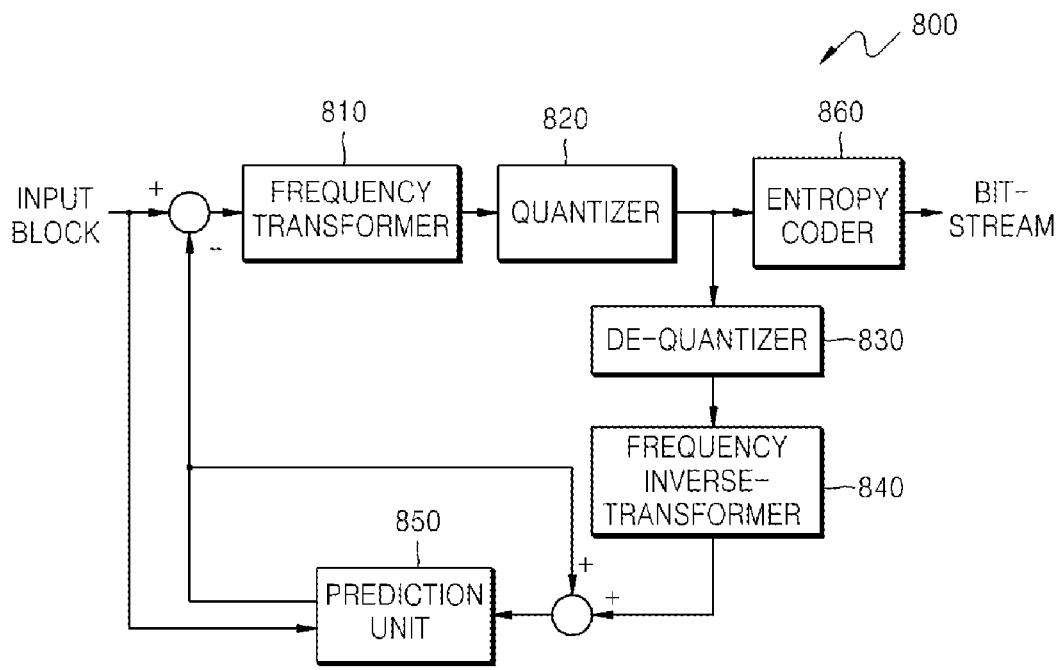
FIG. 8 is a block diagram illustrating a structure of an image coding system that employs an apparatus for transforming an image according to an exemplary embodiment of the present invention.

FIG. 8 is a block diagram illustrating a structure of an image coding system that employs an apparatus 800 for transforming an image according to an exemplary embodiment of the present invention. In FIG. 8, the apparatus 800 for transforming an image corresponds to a frequency transformer 810.

Referring to FIG. 8, a prediction unit 850 creates a prediction block of an input block by performing intra-prediction or inter-prediction. A residual block that is a difference between the input block and the prediction block is input to the frequency transformer 810. By using frequency characteristics of peripheral blocks previously processed, the frequency transformer 810 selects a frequency transform algorithm to be used for the input residual block. Then, according to the selected frequency transform algorithm, the frequency transformer 810 transforms the input residual block into a frequency domain. The transformed residual block is quantized by a quantizer 820 and is then subject to variable-length coding by an entropy coder 860. As a result, the transformed residual block is output in the form of a bit-stream. To be used as reference data for a next block, the quantized residual block is de-quantized and inverse-transformed respectively by a de-quantizer 830 and a frequency inverse-transformer 840, and is then input to the prediction unit 850.

Figure 9:
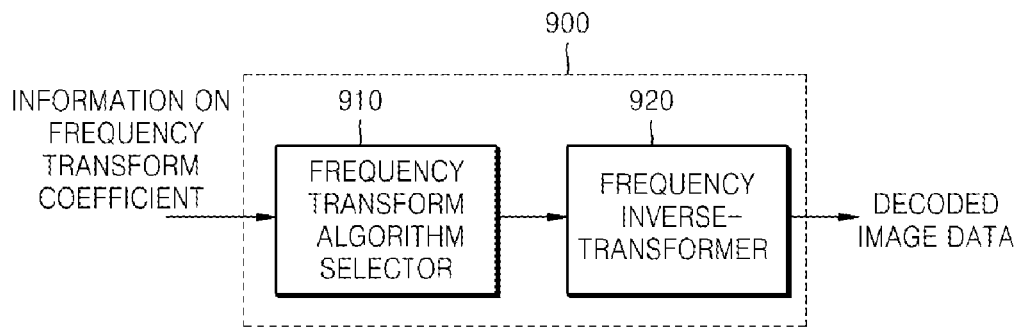
FIG. 9 is a block diagram illustrating a structure of an apparatus for inverse-transforming an image according to an exemplary embodiment of the present invention.

FIG. 9 is a block diagram illustrating a structure of an apparatus for inverse-transforming an image according to an exemplary embodiment of the present invention.

Referring to FIG. 9, an apparatus 900 for inverse-transforming an image includes a frequency transform algorithm selector 910 and a frequency inverse-transformer 920.

The frequency transform algorithm selector 910 selects a frequency transform algorithm, which is used to transform a frequency transform coefficient extracted from a bit-stream, from the aforementioned plurality of frequency transform algorithms. The frequency transform algorithm selector 910 may select a frequency transform algorithm previously used to transform a decoded peripheral block as a frequency transform algorithm used to transform an extracted frequency transform coefficient. Alternatively, if the current block is the inter-prediction block, the frequency transform algorithm selector 910 may select a frequency transform algorithm used for a corresponding block of a reference frame referred by the current block as a frequency transform algorithm used to transform the extracted frequency transform coefficient. In addition, if the bit-stream is coded using a scalable coding scheme, the frequency transform algorithm selector 910 may select a frequency transform algorithm used for a corresponding block of a low hierarchy in association with the current block.

The frequency inverse-transformer 920 uses the selected frequency transform algorithm so as to inverse-transform the extracted frequency transform coefficient.

Figure 10:
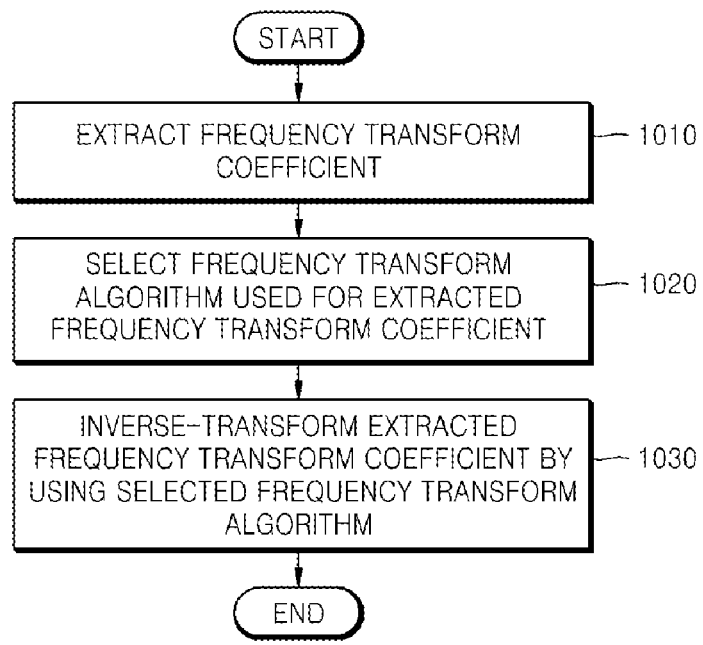
FIG. 10 is a flowchart of a method of inverse-transforming an image according to an exemplary embodiment of the present invention.

FIG. 10 is a flowchart of a method of inverse-transforming an image according to an exemplary embodiment of the present invention.

Referring to FIG. 10, a frequency transform coefficient is extracted from an input bit-stream (operation 1010).

Next, a frequency transform algorithm used to transform the frequency transform coefficient extracted from the bit-stream is selected from a plurality of frequency transform algorithms (operation 1020).

The extracted frequency transform coefficient is inverse-transformed by using the selected frequency transform algorithm, thereby obtaining a restored image (operation 1030).

FIG. 11 is a block diagram illustrating a structure of an image decoding system that employs an apparatus for inverse-transforming an image according to an exemplary embodiment of the present invention.

Referring to FIG. 11, an image decoding system 1100 includes an entropy decoder 1110, a de-quantizer 1120, an inverse-transformer 1130, an adder 1160, an intra-prediction unit 1140, a motion compensation unit 1150, and a filter 1170. The apparatus for inverse-transforming an image corresponds to the inverse-transformer 1130.

On the reception of a bit-stream, the entropy decoder 1110 entropy-decodes the bit-stream and then extracts a quantized frequency transform coefficient. The de-quantizer 1120 de-quantizes the quantized frequency transform coefficient so as to create a frequency transform coefficient. Similar to the frequency inverse-transformer 900 of FIG. 9, the inverse-transformer 1130 selects a frequency transform algorithm used in the process of coding and then inverse-transforms the frequency transform coefficient by using the selected frequency transform algorithm. For example, if the frequency transform algorithm, which is used when the extracted frequency transform coefficient is coded, is defined as a function $B(\bullet)$, and an input block is defined as X, then the inverse-transformer 1130 computes $B^{-1}(B(X))$ for inverse-transform, where $B(X)$ is the frequency transform coefficient and $B^{-1}$ is a reversed function of the selected frequency transform algorithm.

As a result of the inverse-transform, a residual component is restored if the residual component has been coded. The restored residual component is added to a prediction image that is predicted by the intra-prediction unit 1140 or the motion compensation unit 1150, thereby obtaining a restored image.

According to the present invention, a frequency component of an input image is analyzed so that a frequency band is further minutely or roughly divided according to appearance times of a specific frequency. Therefore, image coding efficiency can be improved.

The invention can also be embodied as computer readable code on a computer readable recording medium. The computer readable recording medium may be any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of transforming an image, the method comprising:
    selecting a frequency transform algorithm to be used for a current block from a plurality of frequency transform algorithms according to a result obtained by transforming frequencies of peripheral blocks adjacent to, and non-overlapping with, the current block; and
    transforming the current block into a frequency domain by using the selected frequency transform algorithm,
    wherein the selecting the frequency transform algorithm to be used for the current block comprises:
        selecting a first frequency transform algorithm, from the plurality of frequency transform algorithms, in response to the result obtained by transforming the frequencies of the peripheral blocks being a first result, and
        selecting a second frequency transform algorithm, from the plurality of frequency transform algorithms, in response to the result obtained by transforming the frequencies of the peripheral blocks being a second result, different from the first result.

2. The method of claim 1, wherein each of the plurality of frequency transform algorithms perform a transform in a unit of a frequency that is divided non-uniformly in order to extract specific frequency band components different from one another.

3. The method of claim 1, wherein the respective frequency transform algorithms are based on a discrete cosine transform.

4. The method of claim 1, wherein the selecting comprises:
    determining a frequency band where frequency components of the peripheral blocks are concentrated according to a result obtained by transforming frequencies of the peripheral blocks; and
    selecting a frequency transform algorithm from the plurality of frequency transform algorithms in order to extract a frequency component near the determined frequency band.

5. The method of claim 1, wherein, in the selecting, if the current block is an inter-prediction block, a frequency transform algorithm used for a corresponding block of a reference frame is selected, which is referred to by the current block.

6. The method of claim 1, wherein, in the selecting, if the image is coded in a scalable manner, a frequency transform algorithm is selected which is used by a corresponding block of a low hierarchy in association with the current block or by a peripheral block of the corresponding block.

7. An apparatus for transforming an image, the apparatus comprising:
    a frequency transform algorithm selector which selects a frequency transform algorithm to be used for a current block from a plurality of frequency transform algorithms according to a result obtained by transforming frequencies of peripheral blocks adjacent to, and non-overlapping with, the current block; and
    a frequency transformer which transforms the current block into a frequency domain by using the selected frequency transform algorithm,
    wherein at least one of the frequency transform algorithm selector and the frequency transformer is implemented as a processor,
    wherein the frequency transform algorithm selector selects a first frequency transform algorithm, from the plurality of frequency transform algorithms, in response to the result obtained by transforming the frequencies of the peripheral blocks being a first result, and selects a second frequency transform algorithm, from the plurality of frequency transform algorithms, in response to the result obtained by transforming the frequencies of the peripheral blocks being a second result, different from the first result.

8. The apparatus of claim 7, wherein each of the plurality of frequency transform algorithms perform a transform in a unit of a frequency that is divided non-uniformly in order to extract specific frequency band components different from one another.

9. The apparatus of claim 7, wherein the frequency transform algorithm selector determines a frequency band where frequency components of the peripheral blocks are concentrated according to a result obtained by transforming frequencies of the peripheral blocks, and selects a frequency transform algorithm from the plurality of frequency transform algorithms in order to extract a frequency component near the determined frequency band.

10. The apparatus of claim 7, wherein, if the current block is an inter-prediction block, the frequency transform algorithm selector selects a frequency transform algorithm used for a corresponding block of a reference frame, which is referred to by the current block.

11. The apparatus of claim 7, wherein, if the image is coded in a scalable manner, the frequency transform algorithm selector selects a frequency transform algorithm, which is used by a corresponding block of a low hierarchy in association with the current block or by a peripheral block of the corresponding block.

12. A method of inverse-transforming an image, the method comprising:
   extracting a frequency transform coefficient by entropy-decoding a coded bit-stream;
   selecting a frequency transform algorithm used to transform the extracted frequency transform coefficient from a plurality of frequency transform algorithms in which a frequency band is non-uniformly divided so that a specific frequency band component is transformed; and
   inverse-transforming the frequency transform coefficient by using the selected frequency transform algorithm,
   wherein, in the selecting, a frequency transform algorithm used to transform a previously decoded peripheral block that does not overlap a current block is selected as the frequency algorithm used to transform the extracted frequency transform coefficient
   wherein the selecting the frequency transform algorithm comprises:
      selecting a first frequency transform algorithm, from the plurality of frequency transform algorithms, in response to a result obtained by transforming frequencies of peripheral blocks, adjacent to and non-overlapping with the current block, being a first result, and
      selecting a second frequency transform algorithm, from the plurality of frequency transform algorithms, in response to the result obtained by transforming the frequencies of the peripheral blocks being a second result, different from the first result.

13. The method of claim 12, wherein, in the selecting, if the current block is an inter-prediction block, a frequency transform algorithm used for a corresponding block of a reference frame, which is referred to by the current block is selected as a frequency transform algorithm used to transform the extracted frequency transform coefficient.

14. The method of claim 12, wherein, in the selecting, if the image is coded in a scalable manner, a frequency transform algorithm is selected which is used by a corresponding block of a low hierarchy in association with the current block.

15. An apparatus for inverse-transforming an image, comprising:
   a frequency transform algorithm selector which selects a frequency transform algorithm, which is used to transform a frequency transform coefficient extracted from a bit-stream, from a plurality of frequency transform algorithms in which a frequency band is non-uniformly divided so that a specific frequency band component is transformed; and
   an inverse-transformer which inverse-transforms the frequency transform coefficient by using the selected frequency transform algorithm,
   wherein the frequency transform algorithm selector selects a frequency transform algorithm used to transform a previously decoded peripheral block that does not overlap a current block as the frequency algorithm used to transform the extracted frequency transform coefficient, and
   wherein at least one of the frequency transform algorithm selector and the inverse-transformer is implemented as a processor, and
   wherein the frequency transform algorithm selector selects a first frequency transform algorithm, from the plurality of frequency transform algorithms, in response to a result obtained by transforming frequencies of peripheral blocks, adjacent to and non-overlapping with the current block, being a first result, and selects a second frequency transform algorithm, from the plurality of frequency transform algorithms, in response to the result obtained by transforming the frequencies of the peripheral blocks being a second result, different from the first result.

16. The apparatus of claim 15, wherein, if the current block is an inter-prediction block, the frequency transform algorithm selector selects a frequency transform algorithm used for a corresponding block of a reference frame, which is referred to by the current block as a frequency transform algorithm used to transform the extracted frequency transform coefficient.

17. The apparatus of claim 15, wherein, if the image is coded in a scalable manner, the frequency transform algorithm selector selects a frequency transform algorithm which is used by a corresponding block of a low hierarchy in association with the current block.

18. A computer readable non-transitory recording medium storing a computer readable program for executing a method of transforming an image, the method comprising:
   selecting a frequency transform algorithm to be used for a current block from a plurality of frequency transform algorithms according to a result obtained by transforming frequencies of peripheral blocks adjacent to, and non-overlapping with, the current block; and
   transforming the current block into a frequency domain by using the selected frequency transform algorithm,
   wherein the selecting the frequency transform algorithm to be used for the current block comprises:
      selecting a first frequency transform algorithm, from the plurality of frequency transform algorithms, in response to the result obtained by transforming the frequencies of the peripheral blocks being a first result, and
   selecting a second frequency transform algorithm, from the plurality of frequency transform algorithms, in response to the result obtained by transforming the frequencies of the peripheral blocks being a second result, different from the first result.

* * * * *